(12) United States Patent
Nikiforov et al.

(10) Patent No.: US 7,369,775 B2
(45) Date of Patent: May 6, 2008

(54) WIRELESS DUPLEX OPTICAL COMMUNICATION SYSTEM

(75) Inventors: Evgeny Alexeevich Nikiforov, Moscow (RU); Konstantin Alexandrovich Pobedonostev, Moscow (RU); Anatoly Nikiforovich Chernoplekov, Moscow (RU); Evgeny Matveevich Tolstykh, Moscow (RU); Vladimir Nikolaevich Gordienko, Moscow (RU)

(73) Assignee: Freewire Communications Ltd., Jersey (GB)

( * ) Notice: Subject to any disclaimer, the term of this patent is extended or adjusted under 35 U.S.C. 154(b) by 648 days.

(21) Appl. No.: 10/083,491

(22) Filed: Feb. 27, 2002

(65) Prior Publication Data

US 2002/0126340 A1   Sep. 12, 2002

(30) Foreign Application Priority Data

Mar. 1, 2001   (RU) ............................... 2001105766

(51) Int. Cl.
  *H04B 10/00*   (2006.01)
(52) U.S. Cl. ....................................... 398/128; 398/118
(58) Field of Classification Search ......... 398/118–131
  See application file for complete search history.

(56) References Cited

U.S. PATENT DOCUMENTS

| 4,056,719 | A |  | 11/1977 | Waaben |
| 4,977,618 | A |  | 12/1990 | Allen |
| 5,060,303 | A |  | 10/1991 | Wilmoth |
| 5,130,836 | A |  | 7/1992 | Kaharu et al. |
| 5,329,395 | A |  | 7/1994 | Endo et al. |
| 5,345,327 | A |  | 9/1994 | Savicki |
| 5,532,858 | A |  | 7/1996 | Hirohashi et al. |
| 5,606,444 | A | * | 2/1997 | Johnson et al. ............. 398/125 |
| 5,903,369 | A |  | 5/1999 | Hirayama et al. |
| 6,256,296 | B1 | * | 7/2001 | Ruziak et al. ............. 370/277 |

FOREIGN PATENT DOCUMENTS

| CA | 2122644 | 6/1991 |
| EP | 0 459 289 A1 | 12/1991 |
| EP | 0 548 409 A1 | 6/1993 |
| EP | 0 587 371 A1 | 9/1993 |
| EP | 0 653 852 A1 | 11/1994 |
| EP | 0 849 896 A2 | 6/1998 |
| EP | 0 874 479 A2 | 10/1998 |
| JP | 3-108823 | 5/1991 |
| JP | 7-177092 | 7/1995 |
| WO | 95/20845 | 8/1995 |
| WO | WO95/28777 | 10/1995 |
| WO | WO96/08090 | 3/1996 |
| WO | WO99/31814 | 6/1999 |

* cited by examiner

*Primary Examiner*—Agustin Bello
(74) *Attorney, Agent, or Firm*—Dorsey & Whitney LLP

(57) ABSTRACT

A wireless optical communication systems using two optical transceivers located at the opposite ends of an optical communication line. The optical communication system can be either two-element, when each of the said transceivers contains one optical transmitter (emitter) and one optical receiver, or it can be four-element, where each of the said transceivers contains two optical transmitters and two optical receivers. The output of each of the optical transmitters is a diverging beam of incoherent electromagnetic radiation arranged to have a cross sectional diameter which is larger than the cross sectional diameter of the respective optical receiver at that point on the communication line at which the respective optical receiver is situated. The invention reduces the probability of communication failure, higher noise resistance, and lowers operation and production costs.

18 Claims, 5 Drawing Sheets

WIRELESS DUPLEX OPTICAL COMMUNICATION SYSTEM

The invention relates to wireless optical communication systems and can be used in digital communication systems, in particular for wireless information exchange, e.g. between computers that are moving in relation to each other, or are divided by a barrier impeding the use of wireless communication means.

An optical communication system is known, which uses two terminals located on the ends of an optical communication line formed thereby. Each terminal includes a combination of laser transmitters, which emit a set of laser beams carrying information signals received at the other terminal which are summed up incoherently. However such systems must use laser transmitters in order to operate for long periods, these are expensive and technically complex.

An optical communication system is known, which provides for wireless information exchange and contains the transmitting and receiving components made in the form of an optical transmitter and an optical receiver. The problem with this known system is that environmental conditions influence the stability of communication, when high rates of information transmission, and long range communication are required. In addition such optical communication systems have a short service life with rather high production and operation costs.

Among the environmental conditions that degrade communication there are:
1. Atmospheric phenomena, such as fog, rain, snow. These conditions lead to attenuation of the signal in the communication line.
2. Deformations and slow vibrations of buildings and structures, where optical receivers and optical transmitters (emitters) are installed. These result in a loss or partial reduction of the received signal level due to broken mutual pointing of the optical receivers and optical transmitters (emitters) at the opposite communication points.
3. Crossing of the communication lines by non-transparent objects, e.g. birds, which can bring about sharp short-time weakening of the signal.
4. Position error and change of the angle at which the beam arrives at the optical receiver aperture.
5. When the beam passes through convection currents caused by heat from the sun, for example, fluctuations of the light capacity on the photodiode of the optical receiver can result causing poor communication quality where large beam amplitudes are required.

The present invention is at least in part aimed at minimising the communication quality reduction that result from the above factors as well as providing a system that is cheap to produce and run.

In accordance with the present invention there is provided apparatus for wireless duplex communication, comprising, a first optical transceiver having a first optical transmitter and a first optical receiver, a second optical transceiver having a first optical transmitter and a first optical receiver, the first and second optical transceivers being located at the opposite end of an optical communication line formed thereby, wherein the output of each of the optical transmitters is a diverging beam of incoherent electromagnetic radiation arranged to have a cross sectional diameter which is larger than the cross sectional diameter of the respective optical receiver at that point on the communication line at which the respective optical receiver is situated.

Preferably, the optical transmitter comprises a light emitting diode the incoherent electromagnetic radiation.

Preferably, the optical transmitter comprises the LED and further comprises at least one optical condenser lens, the input to the optical condenser lens being provided by the LED and the output of the optical transmitter being provided by the optical condenser.

Preferably, the optical receiver consists of an optical condenser lens, diaphragm and photodiode, wherein the diaphragm is installed in the focal plane of the optical condenser lens.

Preferably the distance $\Delta$ between the photodiode and the diaphragm situated in the focal plane of the optical condenser lens is defined by the formula $$\Delta = bF/Dc,$$

where
b—diameter of the light-sensitive site of the photodiode,
Dc—diameter of the optical condenser lens.

Preferably, the input of the optical condenser is the input of the optical receiver, and the output of the photodiode is the output of the first optical receiver.

Preferably the beam angle $\theta$ characterizing of the first optical transmitter and the first optical receiver of each of the said transceivers is defined from the following condition:

$$\mathrm{Tan}\, 2\theta = a/F,$$

where
a—diameter of the diaphragm aperture;
F—focal distance of the optical condenser measured from the lens of the optical condenser to the centre of the stop aperture.

Preferably, the beam angle is between 30 and 60 angular minutes.

Preferably, the distance between the optical transmitter and optical receiver of a transceiver is greater than or equal to d/2, where d=30 cm.

Optionally d=60 cm.

Preferably an input of the optical transmitter of the first transceiver is connected to an output of a converter through a modulator, and an output of the optical receiver of the first transceivers is connected to an input of a demodulator, the output thereof being connected to an input of a converter.

Preferably, an input of the optical transmitter of the second transceiver is connected to an output of a converter through a modulator, and an output of the optical receiver of the second transceivers is connected to an input of a demodulators, the output thereof being connected to the input of a converter.

Preferably, the converter is made in the form of a transformer, which transforms the signals of the input discrete information into a coded signal using the Manchester code during transmission, and which is capable of a reverse transformation of signals coming from the outputs of the respective demodulators during reception.

Preferably, each optical transceiver further comprises a second optical transmitter and a second optical receiver.

Preferably, said transceivers are connected to the input of the respective demodulators through a summator.

Preferably, the input of the second optical transmitter of each of the transceivers is connected to the output of the respective modulator, and the outputs of the first and second optical receivers is connected to the input of the respective demodulator through a summator.

In one embodiment of the present invention, the optical system is a two-element system, which uses one optical transmitter (optical emitter) and one optical receiver in each optical transceiver thereby forming two communication channels. When a two-element optical transceiver is used, the spacing of the optical transmitter and the optical receiver creates its own route of beam transmission for each beam of the duplex wireless optical communication line and therefore creates two communication channels. The probability of simultaneous emergence of conditions for maximum deviation of the beam in both transmission directions and thus the probability of simultaneous communication failure in both channels, is reduced as compared to the case of transmission along a single, common route.

In another embodiment of the present invention, the optical system is a four-element system. In this case, each of the said transceivers is equipped with a second optical transmitter and a second optical receiver similar to the first optical transmitter and the first optical receiver, which will together form four communication channels. In this embodiment, the optical transmitters and receivers of each transceiver are spaced on a plane perpendicular to their optical axes in relation to the straight line connecting their optical axes on the plane.

The optical transmitters and receivers of the first transceiver are arranged in the following order:

first optical receiver;
first optical transmitter;
second optical receiver; and
second optical transmitter.

In the second transceiver in relation to the first transceiver, the optical transmitters and receivers are arranged in the following order:

first optical transmitter;
first optical receiver;
second optical transmitter; and
second optical receiver.

It will be appreciated that the order of the first and the second transceivers could be reversed.

The spacing between each component of each transceiver is defined as being d/2, where d=30 cm. It has been found that this value represents a value below which the probability of protection against failures in the system reduces in cases where the line of sight between the transmitter and receiver is obscured by non-transparent objects or where errors in the angle of arrival of the light beam to the optical receiver have occurred or where the bean passes through turbulent atmosphere.

The outputs of the photodiodes of the first and second optical receivers of each of the said transceivers are connected to the input of the respective demodulator through a summator. The outputs of the second optical transmitter in each of the said transceivers are connected to the relevant modulator.

The invention will now be described by way of example only with reference to the accompanying drawings in which.

Figure 1:
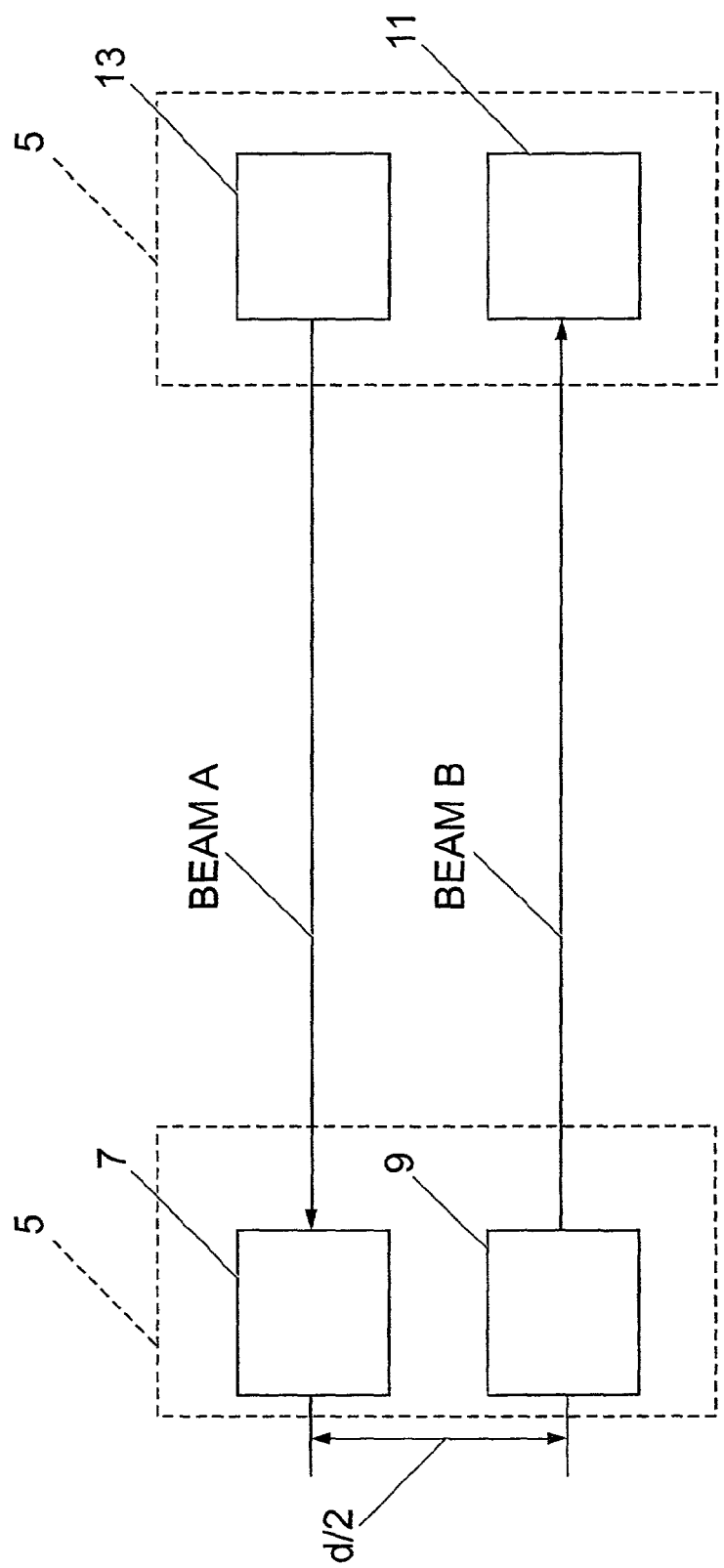
FIG. 1 shows a first embodiment of the present invention having a pair of two-element transceivers FIG. 1 also shows the location (spacing) of the optical transmitters (optical emitters) and the optical receivers of the transceivers as well as the transmission geometry of optical beams emitted by the optical transmitters.
Figure 3:
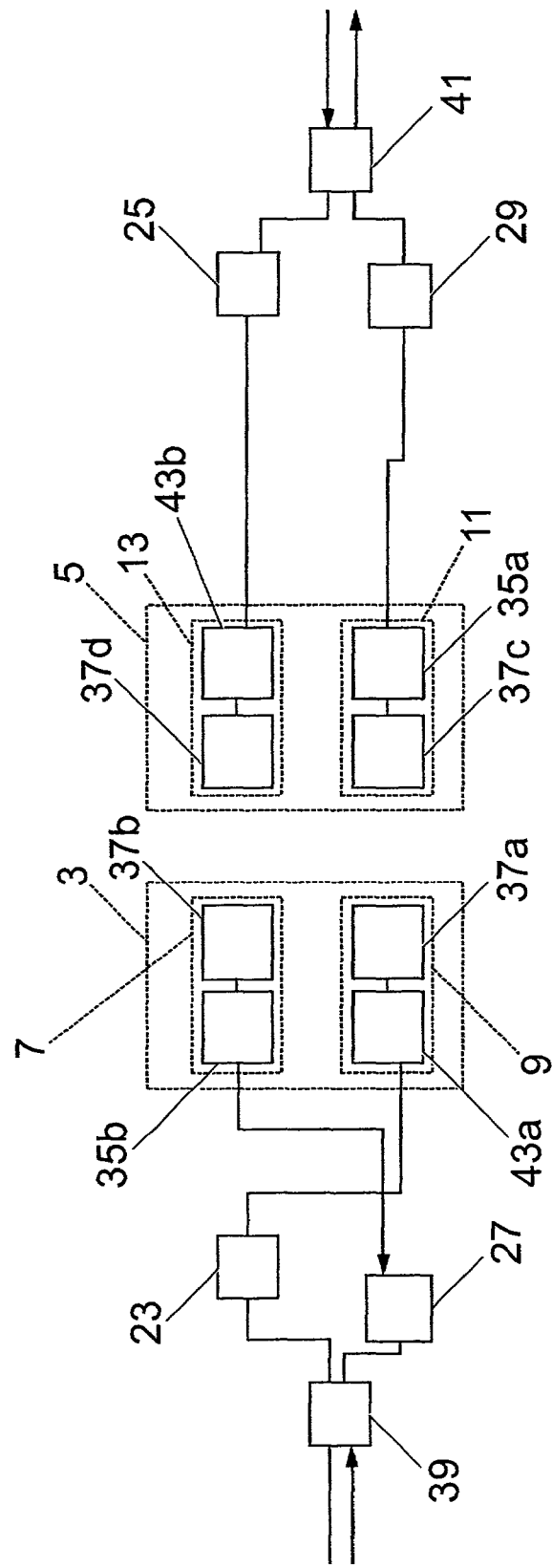
FIG. 3 is a flow chart of the optical communication system for two-element transceivers of FIG. 1.

Referring to FIGS. 1 and 3, the wireless optical duplex communication system uses two-element transceivers each of which are connected to an optical transceiver 3 and 5, a modulator 23 and 25, a demodulator 27 and 29 and a converter 39 and 41. The combination of optical transceiver, modulator, demodulator and converter is referred to as a semi-set. The first 3 and second 5 optical transceivers are located facing each other at the opposite ends of the optical communication line formed therebetween. The converters 39 and 41 are connected to the digital information exchange network (transmission and reception) (not shown). Since the system is duplex, and the operations of information transmission and reception from one semi-set to the other are the same in both directions, the information transmission process will be explained with reference to the communication line (channel) from the first semi-set to the second with two-element transceivers 3 and 5. The input information (input discrete signal) comes to a converter 39 of the first semi-set connected to the first optical transceiver 3, where it is coded utilising Manchester-type code. The input information is then fed at pre-defined logical levels to Modulator 23 which controls the emission of LED 43a which is part of the optical transmitter (optical emitter) 9 in such a way that during transmission of logical "1" light pulses are emitted in the first half of the given clock interval, and during transmission of logical "0" light pulses are transmitted in the second half of the given clock interval. The signal emitted by LED 43a comes to optical condenser 37a of the first optical transmitter 9. The optical condenser 37a forms the beam angle of the optical transmitter 9(optical emitter) to be between 30 and 60 angular minutes. In this example, the LED emits infra-red radiation containing a range of wavelengths typically between 820 and 870 nm. The radiation absorption characteristics in the transmission path of the optical emitter vary depending on atmospheric conditions. The use of a radiation emitter that emits a range of wavelengths ensures that at least some of the radiation reaches the receiver without being absorbed by the atmosphere irrespective of the atmospheric conditions. In other examples of the present invention, larger wavelength ranges can be used in the infra-red region or other parts of the electromagnetic spectrum.

Manchester-type coding is used, because it ensures resistance to impulse noise and reduces the probability of false alarms at the signal/noise ratios found in devices of this type. In the Manchester-type code the leading edge of the signal, is used for coding unities and zeros. During such coding, the bit period (time to transmit one bit of data) is divided into two parts. Information is coded by potential differences happening in the middle of each bit period. A unity is coded by a change from the low level to the high one, and zero by the reverse change. At the beginning of each bit period, there may be a service signal drop, if several unities or zeros are to be transmitted. Since the signal is changed at least once per bit period such a code possesses good self-synchronizing qualities and advantageously, allows the use of two signal levels for data transmission.

Figure 5:
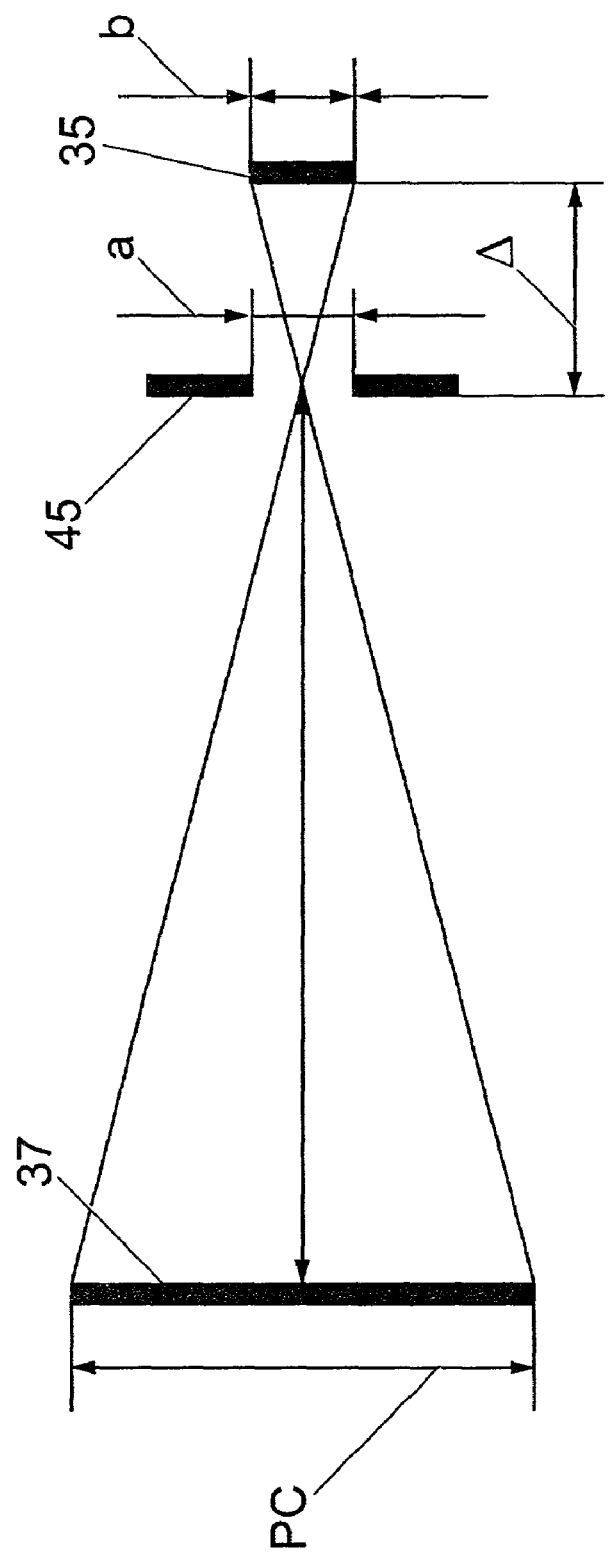
FIG. 5 shows an optical receiver (location of the optical receiver elements) used in the embodiment of the present invention illustrated in FIGS. 1 to 4.

The optical radiation of the first optical transmitter 9 of the first transceiver 3 irradiates the optical condenser 37c of the first optical receiver 15 of the second transceiver 5, see beam A in FIG. 1). The optical energy collected by the optical condenser 37c of the first optical receiver 13 of the second transceiver 5 is directed through a stop or diaphragm aperture 45 (FIG. 5) to a photodiode 35a. Thereafter, it is transformed into an electric signal, and then directed to demodulator 29. The optical condenser of the optical receiver 35 forms an angular beam of between 30 and 60 angular minutes. In the demodulator 29 of the second transceiver 5 the signal is transformed into logical levels of the Manchester-type code and is fed to converter 41 where it is transformed into an information signal in accordance with the requirements of the network protocols and directed to the information transmission digital network.

To reduce the probability of communication failures in case communication lines are crossed by non-transparent objects, the optical receiver and optical transmitter of each semi-set are spaced apart on a plane perpendicular to their optical axes to a distance of d/2 where d=30 cm. This reduces the probability of simultaneous failure in both channels of the duplex communication line.

When a two-element optical transceiver, as described with reference to FIGS. 1 and 3, is used, the spacing of the optical devices creates a separate route of beam transmission for each channel of the duplex communication line (beam A, beam B in FIG. 1). The probability of simultaneous emergence of conditions for the maximum beam deviation in both routes of transmission, and, thus, the probability of a simultaneous communication failure in both channels, is reduced as compared to the case of transmission along a common route.

The present invention, with two-element transceivers using two routes (two communication channels) of beam transmission (beams A, B in FIG. 1) provides for integral summation of signals by two spaced beam transmission routes. The integral summation thus formed in the communication system realizes the information transmission, reception and processing scheme, in which simultaneous failures in both channels are possible only in case of simultaneous communication failures in both beam transmission routes.

A special optical scheme is used for each of the optical receivers (FIG. 5), in which a diaphragm or stop aperture 45 is installed in the focal plane of the lens 37, forming the visual angle of the optical receiver (the beam angle). Angle θ characterizing the beam angle is defined from the condition $$\text{Tan } 2\theta = a/F$$

Where a is the diaphragm aperture diameter.

F is the focal distance of the optical condenser measured from the optical condenser lens to the centre of the diaphragm aperture.

The optical scheme sets the maximum and minimum beam angle for transmission and, in conjunction with the diaphragm 45, reduces the density of the light flow on the photodiode surface and consequently increases the operation resource of LED.

The photodiode 35 is located behind the diaphragm 45 at distance Δ providing for reduced density of the light flow falling on the photodiode, without reducing the value of the light capacity of the said flow, where $$\Delta = bF/D_c.$$

where b is the diameter of the light sensitive photodiode site.

$D_c$ is the diameter of the optical condenser lens.

To remove the effect of deformations and slow vibrations of buildings and structures, the beam angle of optical transmitters (beam divergence) and receivers (visual angle) is standardized. Allowable values of the beam angle of the optical transmitters and receivers are limited to maximum and minimum values and are selected using the above equation to be between 30 and 60 angular minutes in this example. In a typical example, an infra-red beam having a frequency of 340000 GHz and wavelength of 850 nm is created having a beam diameter of 10 m at a distance of 1.5 Km from its source.

In general, the minimum value of the beam angle is a practical limit which ensures the absence of communication failures in case of an error of mutual angular pointing caused by deformations and slow vibrations of buildings or position errors and change of the angle of arrival of the light beam to the aperture of the optical receiver when the beam passes through turbulent atmosphere. The maximum beam angle value is set to provide sufficient power in the communications line to allow effective communication.

Figure 2:
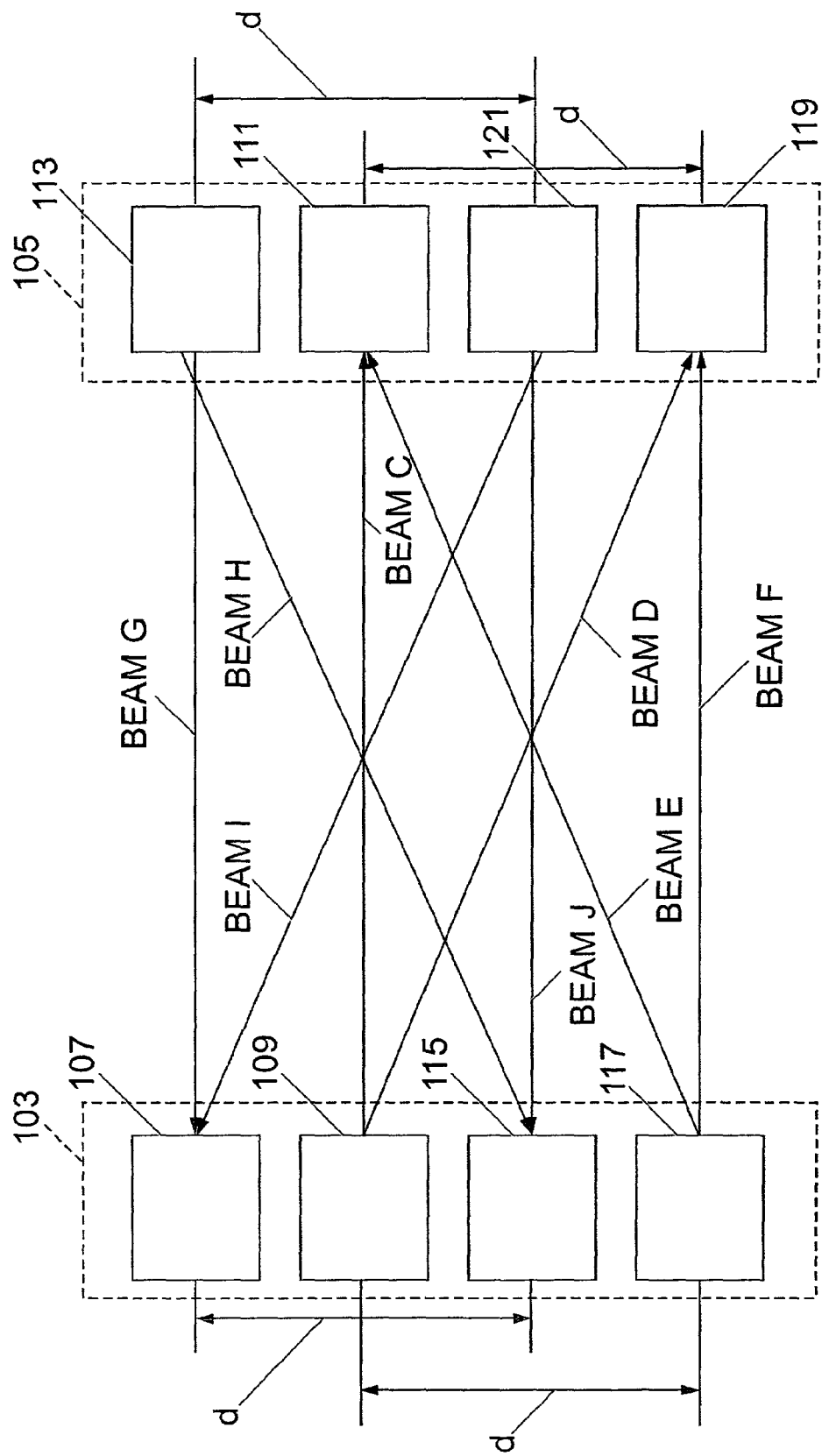
FIG. 2 shows a second embodiment of the present invention having two four-element transceivers, the location (spacing) of the optical transmitters (optical emitters) and the optical receivers in the optical communication system is also shown along with the transmission geometry of optical beams emitted by the optical transmitters.

In an optical communication system where four-element optical transceivers 103, 105 are used (FIGS. 2, 4), each consisting of the first optical transmitter 109, the first optical receiver 107, the second optical transmitter 117, and the second optical receiver 119 are located as shown in FIG. 2 and are similar to the optical transmitters and optical receivers of the two-element transceivers 3, 5.

Figure 4:
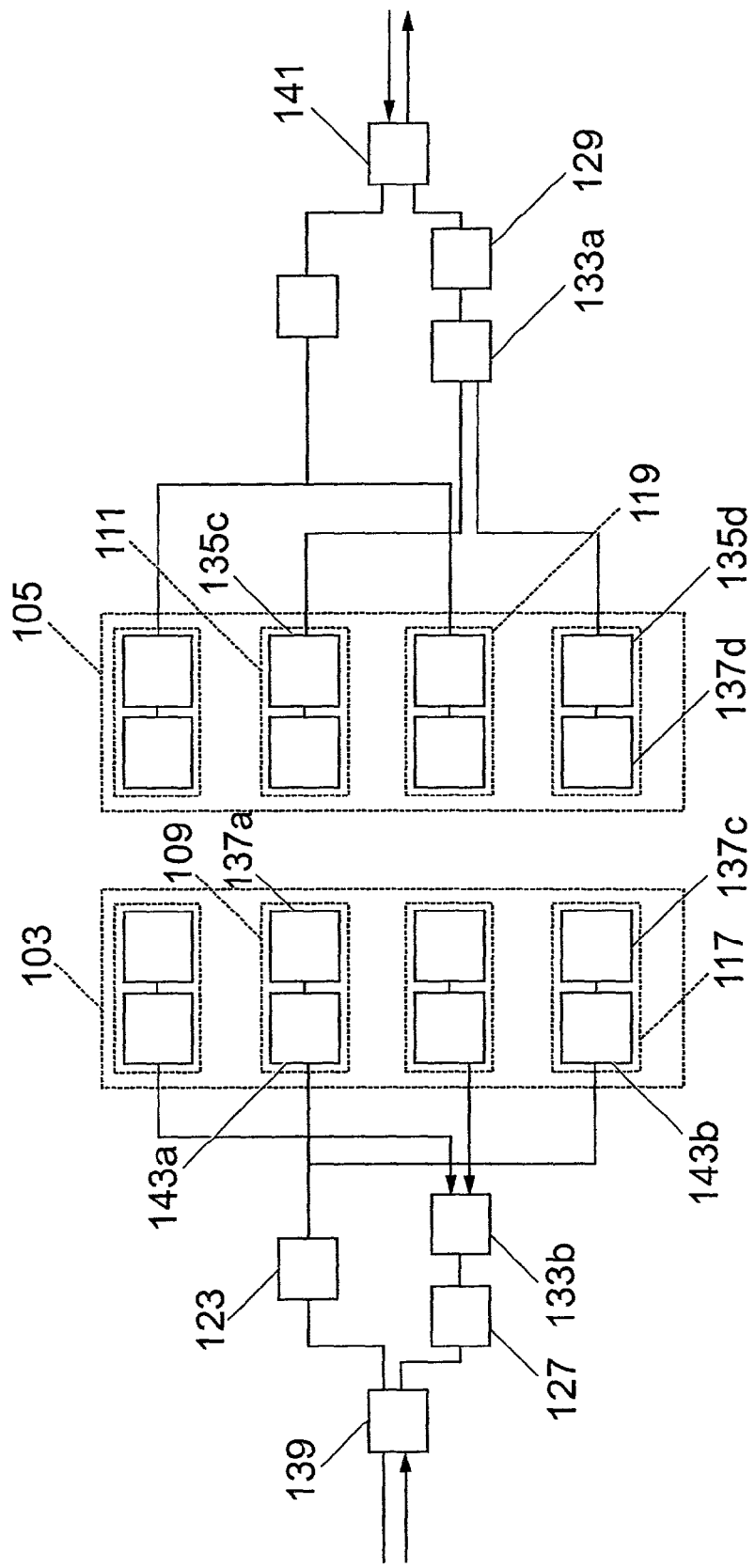
FIG. 4 is a flow chart of the optical communication system for four-element transceivers of FIG. 2.

The information transmission process is as follows, and, since the system is duplex and the operations of information transmission from one transceiver to the other are the same in both directions, the information transmission process will be described with reference to the communication channel from the first transceiver 103 to the second transceiver 105 (FIGS. 2, 4).

The information (signal) comes to converter 139 of the first optical transceiver 103, where it is coded using the Manchester-type code and then fed to Modulator M1 123 of first optical transceiver 103 to control emission of LED 143a and 143b of the first and second optical transmitters 109 and 117 through respective optical condensers 137a, 137c in such a way that during transmission of logical "1 " light impulses are emitted in the first half of the given clock interval, and during transmission of logical "0 " light impulses are transmitted in the second half. Optical condensers 137a and 137c of the first and second optical transmitters 109 and 117 respectively, form the beam angle of each optical transmitter (optical emitter) at between 30 and 60 angular minutes. Manchester-type coding is used as shown above, because it ensures resistance to impulse noise and reduces the probability of false alarm. The optical radiation of each of the optical transmitters 109 and 117 irradiates optical condensers 137b and 137d of the first and second optical receivers 111 and 119 of the second optical transceiver 105 (beams C, D, E and F in FIG. 2). The optical energy collected by the optical condensers 37 (FIG. 5) is directed through the respective diaphragm apertures 45 to respective photodiodes 35, transformed into electric signals summed later in electronic summator Σ2 133 of the second optical transceiver 105. The summator implements the information transmission and processing scheme. A failure of information transmission through the communication channel is possible only where a simultaneous failure in all four beam spreading routes has occured.

Optical condensers 137b and 137d form the beam angle of the respective optical receivers between 30 and 60 angular minutes, and angle θ characterizing the beam angle is also defined from the condition Tan 2θ=a/F, the optical receivers in the four-element system being similar to those in the two-element system.

In the proposed four-element system, integral summation of signals coming through the four beam transmission routes is made, which makes it possible to realize an information transmission and processing scheme that prevents failure of information transmission through the said communication channels except in case of simultaneous failures in all the four beam transmission routes.

In demodulator 129 of the second optical transceiver 105 the signal from the Σ2 summator 133a output is transformed into the logical levels of the Manchester-type code and fed to converter K2 of the second optical transceiver 105, where it is transformed into signals meeting the network protocol requirements and channeled to the digital information (consumer) network.

If we regard the four-element information transmission and reception system as a whole (two transceivers and four respective transmitters and four receivers), its realization allows for the formation of an integral summing system (since summation due to the beam transmission geometry shown in FIG. 2 is made in each communication channel: optical transmitter—optical receiver), which embodies the information transmission and processing system, where a simultaneous failure in all the channels is possible only in case of simultaneous failures in eight beam transmission routes (beams C, D, E, F. G. H, I and J in FIG. 2).

Thus, due to the design of the wireless optical duplex communication system and the use of the Manchester-type code, resistance to impulse noise is increased, and the probability of false alarm is lowered. In addition, the present invention incorporates a data confirmation routine in which confirmation that data has been received at a transceiver is provided by sending a separate data stream in the opposite direction in a different vector space. This is achieved by attaching a characteristic group of symbols to the data packet. The receipt of these symbols is acknowledged by the transmission of an acknowledgement to the data packet transmitter. Where receipt of the data packet has not been acknowledged, transmission of the original data package will be repeated.

Beam angle selection makes it possible to prevent communication failures in case of a mutual angular pointing error where the necessary energy potential in the communication line is available. Spacing of the optical transmitters and receivers at each end (point) of the communication line reduces the probability of failures, when the line is crossed by nontransparent objects. The use of a special optical receiver circuit helps reduce the density of the light flow on the photodiode surface and increases the LED operation resource.

The embodiments of the present invention shown above use LEDs as incoherent light sources. Incoherent light sources have a number of advantages over laser (or coherent) sources for use in communications systems.

The radiation spectrum width of a laser is many times smaller than that of an incoherent light source and the spectral emission width in the atmosphere can correspond to the typical laser radiation spectrum width. Therefore attenuation of the laser beam by atmospheric conditions can be severe. The larger spectrum width of the incoherent light source greatly decreases the likelihood of high attenuation. Therefore, in laser communications systems (depending upon the temperature of the laser, where the wavelength depends upon temperature) attenuation values can exist that correspond to maximum atmospheric spectral emission values, whereas in incoherent systems, such as LED systems, the much larger spectrum width obviates this problem.

In addition, LEDs are much cheaper than lasers to manufacture and unlike lasers, are safe even for personnel located in close proximity to the optical transmitters (emitters). In particular, where high power lasers are used to increase the range over which a communications system can operate, there is an increased health risk to people caught in the beam path. There is no associated health risk with incoherent or LED systems.

Operation costs are also lowered, since the mutual pointing procedure is simplified because the beam angle is wide enough to remove the need for highly accurate pointing of the transmitter at the receiver and the requirements for the structures upon which the optical transmitters and receivers are installed are less strict.

The use of incoherent light sources means that interference between signals in the present invention is minimised.

The apparatus in accordance with the present invention can have an optical path length of 3000 m.

Improvements and modifications may be incorporated without deviating from the scope of the invention.

The invention claimed is:

1. An apparatus for wireless duplex communication, comprising, a first optical transceiver having a first optical transmitter and a first optical receiver, a second optical transceiver having a first optical transmitter and a first optical receiver, the first and second optical transceivers being located at opposite ends of an optical communication line formed thereby, wherein the output of each of the optical transmitters is a diverging beam of incoherent electromagnetic radiation arranged to have a cross sectional diameter which is larger than the cross sectional diameter of the respective optical receiver at that point on the communication line at which the respective optical receiver is situated, wherein each of the optical receivers includes an optical condenser lens having a focal plane, a photodiode, and a diaphragm having an aperture and situated in the focal plane of the optical condenser lens between the optical condenser lens and the photodiode, wherein the distance Δ between the diaphragm and the photodiode is defined by Δ=bF/Dc, where b is the diameter of a light-sensitive site of the photodiode, Dc is the diameter of the optical condenser lens, and F is a focal distance of the optical condenser lens, and wherein a beam angle θ characterizing the first transmitters and the first receivers is defined by Tan 2θ=a/F, where a is the aperture of the diaphragm.

2. An apparatus as claimed in claim 1 wherein the optical transmitter emits electromagnetic radiation having a range of wavelengths.

3. An apparatus as claimed in claim 2 wherein, the optical transmitter emits radiation in the range 800 to 900 nanometres.

4. An apparatus as claimed in claim 1 wherein each optical transmitter comprises a light emitting diode (LED) providing a source of the diverging beam of incoherent electromagnetic radiation.

5. An apparatus as claimed in claim 4 wherein each optical transmitter comprises the LED and further comprises at least one optical condenser lens, the input to the optical condenser lens being provided by the LED and the output of the optical transmitter being provided by the optical condenser.

6. An apparatus as claimed in claim 1 wherein the diverging beam of incoherent electromagnetic radiation from each transmitter has a beam angle of about 30 to 60 angular minutes.

7. An apparatus as claimed in claim 1 wherein an input of the optical condenser lens is an input of the optical receiver, and an output of the photodiode is an output of the first optical receiver.

8. An apparatus as claimed in claim 1 wherein the beam angle is between 30 and 60 angular minutes.

9. An apparatus as claimed in claim 1 wherein the distance between the optical transmitter and optical receiver of a transceiver is greater than or equal to d/2, where d=30 cm.

10. An apparatus as claimed in claim 1 wherein an input of the optical transmitter of the first transceiver is connected to an output of a first converter through a modulator, and an output of the optical receiver of the first transceiver is connected to an input of a demodulator, the output thereof being connected to an input of a second converter.

11. An apparatus as claimed in claim 1 wherein an input of the optical transmitter of the second transceiver is connected to an output of a first converter through a modulator, and an output of the optical receiver of the second transceiver is connected to an input of a demodulator, the output thereof being connected to the input of a converter.

12. An apparatus as claimed in claim 10 wherein the first and second converters are each made in the form of a transformer, wherein the first converter transforms signals of input discrete information into a coded signal using the Manchester code during transmission, and wherein the second converter is capable of reverse transformation of signals coming from the outputs of the respective demodulators during reception.

13. An apparatus as claimed in claim 1 wherein each optical transceiver further comprises a second optical transmitter and a second optical receiver.

14. An apparatus as claimed in claim 13 wherein each of the first and second transceivers further comprises a summator and a demodulator having an input, and wherein the first and second optical receivers in each optical transceiver are connected to the input of the respective demodulator through the summator.

15. An apparatus as claimed in claim 13 wherein each of the first and second transceivers further comprises a modulator having an output, and wherein the input of the second optical transmitter of each of the transceivers is connected to the output of the respective modulator.

16. An apparatus for wireless duplex communication, comprising a first optical transceiver having an optical transmitter and an optical receiver, a second optical transceiver having an optical transmitter and an optical receiver, the first and second optical transceivers being located at opposite ends of an optical communication line, each of the optical transmitters outputting a diverging beam of incoherent electromagnetic radiation and each of the optical receivers including an optical condenser lens, a photodiode, and a diaphragm having an aperture and situated in a focal plane of the optical condenser lens between the optical condenser lens and the photodiode, the distance $\Delta$ between the diaphragm and the photodiode being defined by $\Delta=bF/Dc$, where b is the diameter of a light-sensitive site of the photodiode, Dc is the diameter of the optical condenser lens, and F is a focal distance of the optical condenser lens, and a beam angle $\theta$ characterizing the transmitters and the receivers being defined by $\tan 2\theta=a/F$ and ranging from about 30 to 60 angular minutes.

17. An apparatus as claimed in claim 16 wherein the optical transmitter and the optical receiver of each of the first and second optical transceivers is separated by a distance greater than or equal to d/2, where d=30 cm.

18. An apparatus as claimed in claim 16 wherein each of the first and second optical transceivers further comprises an additional optical transmitter, an additional optical receiver, a modulator, a demodulator, a summator, and first and second converters, wherein the optical transmitter and the additional optical transmitter of each transceiver have their respective inputs connected to an output of the first converter through the modulator, and the optical receiver and the additional optical receiver of each transceiver have their respective outputs connected to an input of a demodulator through the summator, an output of the demodulator being connected to an input of the second converter.

* * * * *